United States Patent
Arnold et al.

(10) Patent No.: US 7,210,148 B2
(45) Date of Patent: *Apr. 24, 2007

(54) METHOD AND APPARATUS FOR DYNAMIC DISTRIBUTED COMPUTING OVER A NETWORK

(75) Inventors: Kenneth C. R. C. Arnold, Lexington, MA (US); James H. Waldo, Dracut, MA (US); Ann M. Wollrath, Groton, MA (US); Peter C. Jones, Winchester, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 656 days.

This patent is subject to a terminal disclaimer.

(21) Appl. No.: 09/809,201

(22) Filed: Mar. 16, 2001

(65) Prior Publication Data

US 2001/0049713 A1    Dec. 6, 2001

Related U.S. Application Data

(63) Continuation of application No. 09/030,840, filed on Feb. 26, 1998, now Pat. No. 6,446,070.

(51) Int. Cl.
*G06F 9/44* (2006.01)
*G06F 15/16* (2006.01)

(52) U.S. Cl. ............... 719/330; 718/105; 719/315; 719/316; 709/223; 709/203

(58) Field of Classification Search ........ 709/200–253; 718/100–105, 1; 707/1, 8, 200–202; 719/310–332
See application file for complete search history.

(56) References Cited

U.S. PATENT DOCUMENTS 3,449,669 A    6/1969    Granqvist (Continued)

FOREIGN PATENT DOCUMENTS

EP    0 300 516 A2    1/1989

(Continued)

OTHER PUBLICATIONS

"Java (TM) Object Serialization Specification", Sun Microsystems, Inc., XP-002242372, <www.dei.estg.iplei.pt/P3/N/material/extra/serial-spec-JDK1_2.pdf>, 1998.

(Continued)

*Primary Examiner*—Lewis A. Bullock, Jr.
(74) *Attorney, Agent, or Firm*—Finnegan, Henderson, Farabow, Garrett & Dunner, L.L.P.

(57) ABSTRACT

A homogeneous execution environment operates within a heterogeneous client-server network. A client selects a server and transmits a procedure call with parameters. In response, a server dynamically and securely downloads code to a compute server; invokes a generic compute method; executes the code on the compute server; and returns the results to the calling client method, preserving the result on the compute server if requested. This technique is efficient in that it does not require multiple copies of code to be downloaded or compiled since server byte-codes can be executed on each of the different systems, therefore downloading or compiling multiple copies of code can be avoided. The code can be compiled once and downloaded as needed to the various servers as byte-codes and then executed.

52 Claims, 5 Drawing Sheets

U.S. PATENT DOCUMENTS

| | | | |
|---|---|---|---|
| 4,430,699 A | 2/1984 | Segarra et al. | |
| 4,491,946 A | 1/1985 | Kryskow, Jr. et al. | |
| 4,558,413 A | 12/1985 | Schmidt et al. | |
| 4,567,359 A | 1/1986 | Lockwood | |
| 4,713,806 A | 12/1987 | Oberlander et al. | |
| 4,800,488 A | 1/1989 | Agrawal et al. | |
| 4,809,160 A | 2/1989 | Mahon et al. | |
| 4,819,233 A | 4/1989 | Delucia et al. | |
| 4,823,122 A | 4/1989 | Mann et al. | |
| 4,939,638 A | 7/1990 | Stephenson et al. | |
| 4,956,773 A | 9/1990 | Saito et al. | |
| 4,992,940 A | 2/1991 | Dworkin | |
| 5,088,036 A | 2/1992 | Ellis et al. | |
| 5,101,346 A | 3/1992 | Ohtsuki | |
| 5,109,486 A | 4/1992 | Seymour | |
| 5,187,787 A | 2/1993 | Skeen et al. | |
| 5,218,699 A | 6/1993 | Brandle et al. | |
| 5,253,165 A | 10/1993 | Leiseca et al. | |
| 5,257,369 A | 10/1993 | Skeen et al. | |
| 5,293,614 A | 3/1994 | Ferguson et al. | |
| 5,297,283 A | 3/1994 | Kelly, Jr. et al. | |
| 5,303,042 A | 4/1994 | Lewis et al. | |
| 5,307,490 A | 4/1994 | Davidson et al. | |
| 5,311,591 A | 5/1994 | Fischer | |
| 5,319,542 A | 6/1994 | King, Jr. et al. | |
| 5,327,559 A | 7/1994 | Priven et al. | |
| 5,339,430 A | 8/1994 | Lundin et al. | |
| 5,339,435 A | 8/1994 | Lubkin et al. | |
| 5,341,477 A | 8/1994 | Pitkin et al. | |
| 5,386,568 A | 1/1995 | Wold et al. | |
| 5,390,328 A | 2/1995 | Frey et al. | |
| 5,392,280 A | 2/1995 | Zheng | |
| 5,423,042 A * | 6/1995 | Jalili et al. | 719/328 |
| 5,440,744 A | 8/1995 | Jacobson et al. | |
| 5,446,901 A | 8/1995 | Owicki et al. | |
| 5,448,740 A | 9/1995 | Kiri et al. | |
| 5,452,459 A | 9/1995 | Drury et al. | |
| 5,455,952 A | 10/1995 | Gjovaag | |
| 5,459,837 A | 10/1995 | Caccavale | |
| 5,471,629 A | 11/1995 | Risch | |
| 5,475,792 A | 12/1995 | Stanford et al. | |
| 5,475,817 A | 12/1995 | Waldo et al. | |
| 5,475,840 A | 12/1995 | Nelson et al. | |
| 5,481,721 A | 1/1996 | Serlet et al. | |
| 5,491,791 A | 2/1996 | Glowny et al. | |
| 5,504,921 A | 4/1996 | Dev et al. | |
| 5,506,984 A | 4/1996 | Miller | |
| 5,511,196 A | 4/1996 | Shackelford et al. | |
| 5,511,197 A | 4/1996 | Hill et al. | |
| 5,524,244 A | 6/1996 | Robinson et al. | |
| 5,544,040 A | 8/1996 | Gerbaulet | |
| 5,548,724 A * | 8/1996 | Akizawa et al. | 709/203 |
| 5,548,726 A | 8/1996 | Pettus | |
| 5,553,282 A | 9/1996 | Parrish et al. | |
| 5,555,367 A | 9/1996 | Premerlani et al. | |
| 5,555,427 A | 9/1996 | Aoe et al. | |
| 5,557,798 A | 9/1996 | Skeen et al. | |
| 5,560,003 A | 9/1996 | Nilsen et al. | |
| 5,561,785 A | 10/1996 | Blandy et al. | |
| 5,577,231 A | 11/1996 | Scalzi et al. | |
| 5,592,375 A | 1/1997 | Salmon et al. | |
| 5,594,921 A | 1/1997 | Pettus | |
| 5,603,031 A | 2/1997 | White et al. | |
| 5,617,537 A | 4/1997 | Yamada et al. | |
| 5,628,005 A | 5/1997 | Hurvig | |
| 5,640,564 A | 6/1997 | Hamilton et al. | |
| 5,644,720 A * | 7/1997 | Boll et al. | 709/227 |
| 5,644,768 A | 7/1997 | Periwal et al. | |
| 5,652,888 A | 7/1997 | Burgess | |
| 5,655,148 A | 8/1997 | Richman et al. | |
| 5,659,751 A | 8/1997 | Heninger | |
| 5,664,110 A | 9/1997 | Green et al. | |
| 5,664,111 A | 9/1997 | Nahan et al. | |
| 5,664,191 A | 9/1997 | Davidson et al. | |
| 5,666,493 A | 9/1997 | Wojcik et al. | |
| 5,671,225 A | 9/1997 | Hooper et al. | |
| 5,671,279 A | 9/1997 | Elgamal | |
| 5,674,982 A | 10/1997 | Greve et al. | |
| 5,675,796 A | 10/1997 | Hodges et al. | |
| 5,675,797 A | 10/1997 | Chung et al. | |
| 5,675,804 A | 10/1997 | Sidik et al. | |
| 5,680,573 A | 10/1997 | Rubin et al. | |
| 5,680,617 A | 10/1997 | Gough et al. | |
| 5,682,534 A | 10/1997 | Kapoor et al. | |
| 5,684,955 A | 11/1997 | Meyer et al. | |
| 5,689,709 A | 11/1997 | Corbett et al. | |
| 5,694,551 A | 12/1997 | Doyle et al. | |
| 5,706,435 A | 1/1998 | Barbara et al. | |
| 5,706,502 A | 1/1998 | Foley et al. | |
| 5,710,887 A | 1/1998 | Chelliah et al. | |
| 5,715,314 A | 2/1998 | Payne et al. | |
| 5,721,825 A | 2/1998 | Lawson et al. | |
| 5,721,832 A | 2/1998 | Westrope et al. | |
| 5,724,540 A | 3/1998 | Kametani | |
| 5,724,588 A | 3/1998 | Hill et al. | |
| 5,727,048 A | 3/1998 | Hiroshima et al. | |
| 5,727,145 A | 3/1998 | Nessett et al. | |
| 5,729,594 A | 3/1998 | Klingman | |
| 5,732,706 A | 3/1998 | White et al. | |
| 5,737,607 A | 4/1998 | Hamilton et al. | |
| 5,742,768 A | 4/1998 | Gennaro et al. | |
| 5,745,678 A | 4/1998 | Herzberg et al. | |
| 5,745,695 A | 4/1998 | Gilchrist et al. | |
| 5,745,703 A | 4/1998 | Cejtin et al. | |
| 5,745,755 A | 4/1998 | Covey | |
| 5,748,897 A | 5/1998 | Katiyar | |
| 5,754,849 A | 5/1998 | Dyer et al. | |
| 5,754,977 A | 5/1998 | Gardner et al. | |
| 5,757,925 A | 5/1998 | Faybishenko | |
| 5,758,077 A | 5/1998 | Danahy et al. | |
| 5,758,328 A | 5/1998 | Giovannoli | |
| 5,758,344 A | 5/1998 | Prasad et al. | |
| 5,761,507 A | 6/1998 | Govett | |
| 5,761,656 A | 6/1998 | Ben-Shachar | |
| 5,764,897 A | 6/1998 | Khalidi | |
| 5,764,915 A | 6/1998 | Heimsoth et al. | |
| 5,764,982 A | 6/1998 | Madduri | |
| 5,768,532 A | 6/1998 | Megerian | |
| 5,774,551 A | 6/1998 | Wu et al. | |
| 5,774,729 A | 6/1998 | Carney et al. | |
| 5,778,179 A | 7/1998 | Kanai et al. | |
| 5,778,187 A | 7/1998 | Monteiro et al. | |
| 5,778,228 A | 7/1998 | Wei | |
| 5,778,368 A | 7/1998 | Hogan et al. | |
| 5,784,560 A | 7/1998 | Kingdon et al. | |
| 5,787,425 A | 7/1998 | Bigus | |
| 5,787,431 A | 7/1998 | Shaughnessy | |
| 5,790,548 A | 8/1998 | Sistanizadeh et al. | |
| 5,790,677 A | 8/1998 | Fox et al. | |
| 5,794,207 A | 8/1998 | Walker et al. | |
| 5,799,173 A | 8/1998 | Gossler et al. | |
| 5,802,367 A | 9/1998 | Held et al. | |
| 5,805,805 A | 9/1998 | Civanlar et al. | |
| 5,806,042 A | 9/1998 | Kelly et al. | |
| 5,808,911 A | 9/1998 | Tucker et al. | |
| 5,809,144 A | 9/1998 | Sirbu et al. | |
| 5,809,507 A | 9/1998 | Cavanaugh, III | |
| 5,812,819 A | 9/1998 | Rodwin et al. | |
| 5,813,013 A | 9/1998 | Shakib et al. | |
| 5,815,149 A | 9/1998 | Mutschler, III et al. | |
| 5,815,709 A | 9/1998 | Waldo et al. | |
| 5,815,711 A | 9/1998 | Sakamoto et al. | |
| 5,818,448 A | 10/1998 | Katiyar | |
| 5,828,842 A * | 10/1998 | Sugauchi et al. | 709/223 |

| Patent No. | Date | Inventor(s) |
|---|---|---|
| 5,829,022 A | 10/1998 | Watanabe et al. |
| 5,832,219 A | 11/1998 | Pettus |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |
| 5,845,090 A | 12/1998 | Collins, III et al. |
| 5,845,129 A | 12/1998 | Wendorf et al. |
| 5,850,442 A | 12/1998 | Muftic |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,872,973 A | 2/1999 | Mitchell et al. |
| 5,875,335 A | 2/1999 | Beard |
| 5,878,411 A | 3/1999 | Burroughs et al. |
| 5,884,024 A | 3/1999 | Lim et al. |
| 5,884,079 A | 3/1999 | Furusawa |
| 5,887,134 A | 3/1999 | Ebrahim |
| 5,887,172 A | 3/1999 | Vasudevan et al. |
| 5,889,951 A | 3/1999 | Lombardi |
| 5,889,988 A | 3/1999 | Held |
| 5,890,158 A | 3/1999 | House et al. |
| 5,892,904 A | 4/1999 | Atkinson et al. |
| 5,905,868 A | 5/1999 | Baghai et al. |
| 5,913,029 A | 6/1999 | Shostak |
| 5,915,112 A | 6/1999 | Boutcher |
| 5,925,108 A | 7/1999 | Johnson et al. |
| 5,933,497 A | 8/1999 | Beetcher et al. |
| 5,933,647 A | 8/1999 | Aronberg et al. |
| 5,935,249 A | 8/1999 | Stern et al. |
| 5,940,827 A | 8/1999 | Hapner et al. |
| 5,944,793 A | 8/1999 | Islam et al. |
| 5,946,485 A | 8/1999 | Weeren et al. |
| 5,946,694 A | 8/1999 | Copeland et al. |
| 5,949,998 A | 9/1999 | Fowlow et al. |
| 5,951,652 A | 9/1999 | Ingrassia, Jr. et al. |
| 5,956,509 A | 9/1999 | Kevner |
| 5,960,404 A * | 9/1999 | Chaar et al. ............ 705/8 |
| 5,961,582 A | 10/1999 | Gaines |
| 5,963,924 A | 10/1999 | Williams et al. |
| 5,963,947 A | 10/1999 | Ford et al. |
| 5,966,435 A | 10/1999 | Pino |
| 5,966,531 A | 10/1999 | Skeen et al. |
| 5,969,967 A | 10/1999 | Aahlad et al. |
| 5,974,201 A | 10/1999 | Chang et al. |
| 5,978,484 A | 11/1999 | Apperson et al. |
| 5,978,773 A | 11/1999 | Hudetz et al. |
| 5,982,773 A | 11/1999 | Nishimura et al. |
| 5,987,506 A | 11/1999 | Carter et al. |
| 5,991,808 A * | 11/1999 | Broder et al. .......... 709/226 |
| 5,996,075 A | 11/1999 | Matena |
| 5,999,179 A | 12/1999 | Kekic et al. |
| 5,999,988 A | 12/1999 | Pelegri-Llopart et al. |
| 6,003,050 A | 12/1999 | Silver et al. |
| 6,003,065 A * | 12/1999 | Yan et al. ............... 709/201 |
| 6,003,763 A | 12/1999 | Gallagher et al. |
| 6,009,103 A | 12/1999 | Woundy |
| 6,009,413 A | 12/1999 | Webber et al. |
| 6,009,464 A * | 12/1999 | Hamilton et al. .......... 709/219 |
| 6,014,686 A | 1/2000 | Elnozahy et al. |
| 6,016,496 A | 1/2000 | Roberson |
| 6,016,516 A | 1/2000 | Horikiri |
| 6,018,619 A | 1/2000 | Allard et al. |
| 6,023,586 A | 2/2000 | Gaisford et al. |
| 6,026,414 A | 2/2000 | Anglin |
| 6,031,977 A | 2/2000 | Pettus |
| 6,032,151 A | 2/2000 | Arnold et al. |
| 6,034,925 A | 3/2000 | Wehmeyer |
| 6,041,351 A * | 3/2000 | Kho ....................... 709/224 |
| 6,044,381 A | 3/2000 | Boothby et al. |
| 6,052,761 A | 4/2000 | Hornung et al. |
| 6,055,562 A | 4/2000 | Devarakonda et al. |
| 6,058,381 A | 5/2000 | Nelson |
| 6,058,383 A | 5/2000 | Narasimhalu et al. |
| 6,061,699 A | 5/2000 | DiCecco et al. |
| 6,061,713 A | 5/2000 | Bharadhwaj |
| 6,067,575 A | 5/2000 | McManis et al. |
| 6,078,655 A | 6/2000 | Fahrer et al. |
| 6,085,030 A * | 7/2000 | Whitehead et al. ......... 709/203 |
| 6,085,255 A | 7/2000 | Vincent et al. |
| 6,092,194 A | 7/2000 | Touboul |
| 6,093,216 A | 7/2000 | Adl-Tabatabai et al. |
| 6,101,528 A | 8/2000 | Butt |
| 6,104,716 A | 8/2000 | Crichton et al. |
| 6,108,346 A | 8/2000 | Doucette et al. |
| 6,134,603 A | 10/2000 | Jones et al. |
| 6,154,844 A | 11/2000 | Touboul et al. |
| 6,157,960 A * | 12/2000 | Kaminsky et al. .......... 719/315 |
| 6,182,083 B1 | 1/2001 | Scheifler et al. |
| 6,185,602 B1 | 2/2001 | Bayrakeri |
| 6,185,611 B1 | 2/2001 | Waldo et al. |
| 6,189,046 B1 | 2/2001 | Moore et al. |
| 6,192,044 B1 | 2/2001 | Mack |
| 6,199,068 B1 | 3/2001 | Carpenter |
| 6,199,116 B1 | 3/2001 | May et al. |
| 6,212,578 B1 | 4/2001 | Racicot et al. |
| 6,216,138 B1 | 4/2001 | Wells et al. |
| 6,216,158 B1 | 4/2001 | Luo et al. |
| 6,219,675 B1 | 4/2001 | Pal et al. |
| 6,226,746 B1 | 5/2001 | Scheifler |
| 6,243,716 B1 | 6/2001 | Waldo et al. |
| 6,243,814 B1 | 6/2001 | Matena |
| 6,247,091 B1 | 6/2001 | Lovett |
| 6,253,256 B1 | 6/2001 | Wollrath et al. |
| 6,263,350 B1 | 7/2001 | Wollrath et al. |
| 6,263,379 B1 | 7/2001 | Atkinson et al. |
| 6,269,401 B1 | 7/2001 | Fletcher et al. |
| 6,272,559 B1 | 8/2001 | Jones et al. |
| 6,282,295 B1 | 8/2001 | Young et al. |
| 6,282,568 B1 | 8/2001 | Sondur et al. |
| 6,282,581 B1 | 8/2001 | Moore et al. |
| 6,292,934 B1 | 9/2001 | Davidson et al. |
| 6,301,613 B1 | 10/2001 | Ahlstrom et al. |
| 6,321,275 B1 | 11/2001 | McQuistan et al. |
| 6,327,677 B1 | 12/2001 | Garg et al. |
| 6,339,783 B1 | 1/2002 | Horikiri |
| 6,343,308 B1 | 1/2002 | Marchesseault |
| 6,351,735 B1 | 2/2002 | Deaton et al. |
| 6,360,266 B1 | 3/2002 | Pettus |
| 6,363,409 B1 | 3/2002 | Hart et al. |
| 6,378,001 B1 | 4/2002 | Aditham et al. |
| 6,385,643 B1 | 5/2002 | Jacobs et al. |
| 6,408,342 B1 | 6/2002 | Moore et al. |
| 6,418,468 B1 | 7/2002 | Ahlstrom et al. |
| 6,446,070 B1 * | 9/2002 | Arnold et al. ............ 707/10 |
| 6,463,480 B2 * | 10/2002 | Kikuchi et al. ............ 719/315 |
| 6,505,248 B1 | 1/2003 | Casper et al. |
| 6,564,174 B1 | 5/2003 | Ding et al. |
| 6,578,074 B1 | 6/2003 | Bahlmann |
| 6,603,772 B1 | 8/2003 | Moussavi et al. |
| 6,604,127 B2 | 8/2003 | Murphy et al. |
| 6,604,140 B1 | 8/2003 | Beck et al. |
| 6,654,793 B1 | 11/2003 | Wollrath et al. |
| 6,704,803 B2 | 3/2004 | Wilson et al. |
| 6,757,729 B1 | 6/2004 | Devarakonda et al. |
| 6,801,940 B1 | 10/2004 | Moran et al. |
| 6,801,949 B1 | 10/2004 | Bruck et al. |
| 6,804,711 B1 | 10/2004 | Dugan et al. |
| 6,804,714 B1 | 10/2004 | Tummalapalli |
| 2001/0003824 A1 | 6/2001 | Schnier |
| 2001/0011350 A1 | 8/2001 | Zabelian |
| 2002/0059212 A1 | 5/2002 | Takagi |
| 2002/0073019 A1 | 6/2002 | Deaton |

| | | | |
|---|---|---|---|
| 2002/0111814 | A1 | 8/2002 | Barnett et al. |
| 2003/0005132 | A1 | 1/2003 | Nguyen et al. |
| 2003/0084204 | A1* | 5/2003 | Wollrath et al. ............ 709/330 |
| 2003/0191842 | A1 | 10/2003 | Murphy et al. |

FOREIGN PATENT DOCUMENTS

| | | |
|---|---|---|
| EP | 0 351 536 A3 | 1/1990 |
| EP | 0 384 339 A3 | 8/1990 |
| EP | 0 472 874 A1 | 3/1992 |
| EP | 0 474 340 A2 | 3/1992 |
| EP | 497 022 A1 | 8/1992 |
| EP | 0 555 997 A2 | 8/1993 |
| EP | 0 565 849 A2 | 10/1993 |
| EP | 0 569 195 A3 | 11/1993 |
| EP | 0 625 750 A2 | 11/1994 |
| EP | 0 635 792 A2 | 1/1995 |
| EP | 0 651 328 A1 | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |
| EP | 0 803 811 A2 | 10/1997 |
| EP | 0 805 393 A2 | 11/1997 |
| EP | 0 810 524 A1 | 12/1997 |
| EP | 0 817 020 A2 | 1/1998 |
| EP | 0 817 022 A2 | 1/1998 |
| EP | 0 817 025 A2 | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 7-168744 | 4/1995 |
| WO | WO92/07335 | 4/1992 |
| WO | WO92/09948 | 6/1992 |
| WO | WO93/25962 A1 | 12/1993 |
| WO | WO94/03855 | 2/1994 |
| WO | WO96/03692 | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |
| WO | WO 99/17194 | 4/1999 |
| WO | WO 01/13228 A2 | 2/2001 |
| WO | WO 01/86394 A2 | 11/2001 |
| WO | WO 01/90903 A1 | 11/2001 |

OTHER PUBLICATIONS

"Java.io ObjectInputStream", XP-002243027, <java.sun.com/products/jdk/1.1/docs/guide/serialization/spec>, 1998, p. 1230-1232, 1263-1264 & 1283.

Opyrchal et al., "Efficient Object Serialization in Jave", Department of Electrical Engineering and Computer Science, University of Michigan, May 5, 1999.

Osborn, "The Role of Polymorphism in Schema Evolution in an Object-Oriented Database," IEEE Transactions on Knowledge and Data Engineering, vol. 1, No. 3, Sep. 1989, pp. 310-317.

Kolodner et al., "Atomic Garbage Collection: Managing a Stable Heap," ACM, 1989, pp. 15-25.

"Consumers Can View, Share Picture On-Line as Kodak Picture Network Goes 'Live'," Business Wire, Aug. 25, 1997, pp. 18-19.

"ISN Dataweb Sells Software, Hardware," Datamation, Apr. 1, 1996, p. 40.

"Kodak DC220 And DC260 Digital Cameras Are Shipping To Retailers Across The Country Camersas Art Optimized for USB Interface supported in Windows 98," Business Wire, Jun. 24, 1998, pp. 42-44.

"Kodak demonstrates leadership across entire photographic category," M2 Presswire, Feb. 13, 1998, pp. 31-35.

"Kodak PhotoNet Online Makes It a Snap to Share Summer Photos," PR Newswire, Jul. 2, 1998, pp. 63-64.

"Kodak Picture Network Sends Prints Home From the Holidays," Business Wire, Dec. 29, 1997, pp. 58-60.

"Photo processing made easy on the Internet; Storm Software and PicturVision team up with Konica Corp.," Business Wire, Feb. 22, 1996, pp. 3-4.

"Seeing your photos a whole new way," Business Wire, Dec. 12, 1996, pp. 9-10.

"Webwatch: MCI Announces Internet Access,", Boardwatch Magazine, Jan. 1995.

Administrator's Guide, Netscape Enterprise Server, Version 3.0, Netscape Communications Corp., 1998.

Bandrowski, "Stores Without Doors: Kiosks Generate New Profits," Corporate Computing, Oct. 1992, pp. 193-195.

Bruno, "Working the Web," Data Communications, Apr. 1997, pp. 50-60.

Cohen, "Electronic Commerce," USC/Information Sciences Institute, Oct. 1989.

Conhaim, "Online shopping: a beginner's guide; includes related listing of videotex services," Link-Up, vol. 5, No. 6, p. 32, Nov. 1988.

Design Project #2, Electronic Shopping at MIT, MIT Class 6.033 Handout 23, Massachusetts Institute of Technology, http://web.mit.edu/6.033/1995/handouts/html/h23.html, Spring1995, pp. 1-6.

Ellsworth, "Boom Town," Internet World, Jun. 1995, pp. 33-35.

Estrin, "Inter-Organization Networks: Implications of Access Control Requirements for Interconnection Protocols," ACM, 1986, pp. 254-263.

Fleischer, "SkyMall's 'Supplier Network' Takes Flight", Retailtech, The Technology Magazine for Retail Executives, Apr. 1997.

Foley, "Managing Campus-Wide Information Systems: Issues and Problems," Capitalizing on Communication, ACM SIGUCCS XVII, 1989, pp. 169-174.

Fryxell, "eaasySABRE," Link-Up, May/Jun. 1996, pp. 10-11.

Gardner, "Kodak Follows Startup Into Online Photo Processing Business," Internet World, Sep. 8, 1997, pp. 5-6.

Gogan et al., "Open Market, Inc.: Managing in a Turbulent Environment," Harvard Business School Publishing, Aug. 29, 1996, pp. 1-30.

Israel et al., "Authentication in Office System Internetworks," ACM Transactions on Office Information Systems, vol. 1, No. 3, Jul. 1983, pp. 193-210.

Keller, "Smart Catalogs and Virtual Catalogs," Proceedings of the First USENIX Workshop of Electronic Commerce, USENIX Association, Jul. 11-12, 1995, pp. 125-131.

Kline et al., "TRADE'ex: The Stock Exchange of the Computer Industry," Harvard Business School Publishing, 1996, pp. 1-14.

Kodak Photonet FAQ, PhotoNet Online, Jun. 14, 2002, pp. 1-3.

Kramer, "NETWATCH; The AJC's Daily Online Guide; Get the picture: Kodak will send photos to Web," The Atlanta Journal and Constitution, Sec. Features, p. 08C, Jun. 5, 1997.

Lampson et al., "Authentication in Distributed Systems: Theory and Practice," ACM Transactions n Computer Systems, vol. 10, No. 4, Nov. 1992, pp. 265-310.

Lansky, "Without APS, Photo Life Goes on Via Internet," Photographic Trade News, Aug. 1996, pp. 19-23.

Lewis, "Pacific Bell, MCI to Expand Internet Service," The New York Times, sec. D, col. 1 at 3, Mar. 28, 1995.

LightSurf Instant Imaging—Press Releases, "Kodak And LightSurf Collaborate On Kodak Picture Center Online," LifeSurf Technologies Inc., Jun. 14, 2002, pp. 1-3.

Louwerse et al., "Data Protection Aspects in an Integrated Hospital Information System," North-Holland Computers & Security 3, 1984, pp. 286-294.

McEnaney, "Point-and-Click Memory Sharing; Launches PhotoNet online digital photography and imaging services, " Photographic Trade News, Sec. p. 23, Jan. 1997.

Miller, "Web posting as a photo processing option," USA Today, Section: Life, p. 17D, Dec. 13, 1996.

Morris et al., "Andrew: A Distributed Personal Computing Environment," Communications of the ACM, vol. 29, No. 3, Mar. 1986, pp. 184-201.

O'Mahony, "Security Considerations in a Network Management Environment," IEEE Network, May/Jun. 1994, pp. 12-17.

Oppen et al., "The Clearinghouse: A Decentralized Agent for Locating Names Objects in a Distributed Environment," ACM Transactions on Office Information Systems, vol. 1, No. 3, Jul. 1983, pp. 230-253.

Petersen, "new But Not Improved, " Direct Magazine, Nov. 1995.

Press Release, "Sun Goes Live With The Kodak Picture Network," Sun Microsystems, Inc., Jun. 14, 2002, pp. 1-2.

Raeder, "Is there a Prodigy in your future!," Database Searcher, vol. 5, No. 6, p. 18.

Ramm et al., "Exu—A System for Secure Delegation of Authority on an Insecure Newtork," Ninth System Administration Conference, 1995 LISA IX, Sep. 17-22, 1995, pp. 89-93.

Satyanarayanan, "Integrating Security in a Large Distributed System," ACM Transactions on Computer Systems, vol. 7, No. 3, Aug. 1989, pp. 247-280.

Schroeder et al., "Experience with Grapevine: The Growth of a Distributed System," ACM Transactions on Computer Systems, vol. 2, No. 1, Feb. 1984, pp. 3-23.

Senn, "Capitalizing on Electronic Commerce: The Role of the Internet in Electronic Markets," Information Systems Management, Summer 1996, pp. 15-24.

Steinke, "Design Aspects of Access Control in a Knowledge Base System," Computers & Security, 10, 1991, pp. 612-625.

Stern, "Industry Net," Link-Up, Mar./Apr. 1995, p. 10.

Tanenbaum et al., "Distributed Operating Systems," Computing Surveys, vol. 17, No. 4, Dec. 1985, pp. 419-470.

The Wall street Journal, "Barclays Is Opening An 'Electronic Mall' For Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Trommer, "Thomas Unveils Online Purchasing Network—Eases Product Sourcing And Ordering Through EDI," Electronic Buyers' News at 60, Dec. 11, 1995.

Van Den Berg et al., "Advanced Topics of a Computer Center Audit," North-Holland Computers & Security 3, 1984, pp. 171-185.

Van Der Lans, "Data Security in a Relational Database Environment," North-Holland Computers & Security 5, 1986, pp. 128-134.

Welz, "New Deals: A ripening Internet market, secure systems and digital currency are reshaping global commerce," Internet World, Jun. 1995, pp. 36-41.

Wobber et al., "Authentication in the Taos Operating System," ACM, 1993, pp. 256-269.

Wyatt, "Netscape Enterprise Server," Prima Publishing, 1996.

Jacob, "The use of distributed objects and dynamic interfaces in a wide-area transaction environment," SIGCOMM '95 Workshop on Middleware: Cambridge, Mass., Aug. 1995, pp. 1-3.

"Eden Project Proposal," Department of Computer Science, University of Washington, Oct. 1980, Technical Report #80-10-01, cover and Foreword.

Almes et al., "Edmas: A Locally Distributed Mail System," Department of Computer Science, University of Washington, Technical Report 83-07-01, Jul. 7, 1983, Abstract & pp. 1-17.

Almes et al., "Research in Integrated Distributed Computing," Department of Computer Science, University of Washington, Oct. 1979, pp. 1-42.

Almes et al., "The Eden System: A Technical Review," Department of Computer Science, University of Washington, Technical Report 83-10-05, Oct. 1983, pp. 1-25.

Almes, "Integration and Distribution in the Eden System," Department of Computer Science, University of Washington, Technical Report 83-01-02, Jan. 19, 1983, pp. 1-18 & Abstract.

Almes, "The Evolution of the Eden Invocation Mechanism," Department of Computer Science, University of Washington, Technical Report 83-01-03, Jan. 19, 1983, pp. 1-14 & Abstract.

Arnold, Ken, "The Jini Architecture: Dynamic Services in a Flexible Network," Sun Microsystems, Inc., Proceedings of the 36th ACM IEEE Design Automation Conference, Jun. 1999, pp. 157-162.

Begole et al., "Transparent Sharing of Java Applets: A Replicated Approach," Oct. 1997, pp. 55-65.

Black et al., "A Language for Distributed Programming," Department of Computer Science, University of Washington, Technical Report 86-02-03, Feb. 1986, p. 10.

Black et al., "Distribution and Abstract Types in Emerald," University of Washington, Technical Report No. 85-08-05, Aug. 1985, pp. 1-10.

Black et al., "Object Structure in the Emerald System," University of Washington, Technical Report 86-04-03, Apr. 1986, pp. 1-14.

Black et al., "The Eden Project: A Final Report," Department of Computer Science, University of Washington, Technical Report 86-11-01, Nov. 1986, pp. 1-28.

Black, "Supporting Distributed Applications: Experience with Eden," Department of Computer Science, University of Washington, Technical Report 85-03-02, Mar. 1985, pp. 1-21.

Black, "The Eden Programming Language," Department of Computer Science, FR-35, Univeristy of Washington, Technical Report 85-09-01, Sep. 1985 (Revised Dec. 1985), pp. 1-19.

Black, "The Eden Project: Overview and Experiences," Department of Computer Science, University of Washington, EUUG, Autumn '86 Conference Proceedings, Manchester, UK, Sep. 22-25, 1986, pp. 177-189.

Braine et al., "Object-Flow," 1997, pp. 418-419.

Ciancarini et al., "Coordinating Distributed Applets with Shade/Java," Feb. 1998, pp. 130-138.

Delcambre et al., "Simulation of the Object Flow Model: A Conceptual Modeling Language for Object-Driven Applications," 1993, pp. 216-225.

Goldberg et al., "Smalltalk-80—The Language and its Implementation," Xerox Palo Alto Research Center, 1983 (reprinted with corrections, Jul. 1985), pp. 1-720.

Holman et al., "The Eden Shared Calendar System," Department of Computer Science, FR-35, University of Washington, Technical Report 85-05-02, Jun. 22, 1985, pp. 1-14.

Hsu, "Reimplementing Remote Procedure Calls," University of Washington, Thesis, Mar. 22, 1985, pp. 1-106.

Hutchinson, "Emerald: An Object-Based Language for Distributed Programming," a Dissertation, University of Washington, 1987, pp. 1-107.

Jul et al., "Fine-Grained Mobility in the Emerald System," University of Washington, ACM Transactions on Computer Systems, vol. 6, No. 1, Feb. 1988, pp. 109-133.

Jul, "Object Mobility in a Distributed Object-Oriented System," a Dissertation, University of Washington, 1989, pp. 1-154 (1 page Vita).

Koshizuka et al., "Window Real-Objects: A Distributed Shared Memory for Distributed Implementation of GUI Applications," Nov. 1993, pp. 237-247.

Krasner et al., "Smalltalk-80: Bits of History, Words of Advice," 1983, Xerox Corporation, pp. 1-344.

Lavana et al., "Executable Workflows: A Paradigm for Collaborative Design on the Internet," Jun. 1997, 6 pages.

Proceedings of the Eighth Symposium on Operating Systems Principles, Dec. 14-16, 1981, ACM, Special Interest Group on Operating Systems, Association for Computing Machinery, vol. 15, No. 5, Dec. 1981, ACM Order No. 534810.

Proudfoot, "Replects: Data Replication in the Eden System," Department of Computer Science, University of Washington, Technical Report No. TR-85-12-04, Dec. 1985, pp. 1-156.

Pu, "Replication and Nested Transaction in the Eden Distributed System," Doctoral Dissertation, University of Washington, Aug. 6, 1986, pp. 1-179 (1 page Vita).

Trehan et al., "Toolkit for Shared Hypermedia on a Distributed Object Oriented Architecture," 1993, pp. 1-8.

Hodges, Douglas, "Managing Object Lifetimes in OLE," Aug. 25, 1994, pp. 1-41.

"Java (TM) Remote Method Invocation Specification," Sun Microsystems, Inc., <java.sun.com/products/jdk1.2beta1>, 1997.

"Transparent Network Computing," Locus Computing Corporation, Jan. 5, 1995.

Agha et al., "Actorspaces: An Open Distributed Programming Paradigm," University of Illinois, Report No. UIUCDCS-R-92-1766, Open Systems Laboratory TR No. 8, pp. 1-12, Nov. 1992.

Ahmed et al., "A Program Building Tool for Parallel Applications," Yale University, pp. 1-23, Dec. 1, 1993.

Aldrich et al., "Providing Easier Access to Remote Objects in Client-Server Systems," System Sciences, 1998, Proceedings of the 31st Hawaii Internat'l . Conference, Jan. 6-9, 1998, pp. 366-375.

Aldrich et al., "Providing Easier Access to Remote objects in Distributed Systems," Calif. Institute of Technology, www.cs.caltech.edu/%7Ejedi/paper/jedipaper.html, Nov. 21, 1997.

Alexander et al., "Active Bridging," Proceedings of the ACM/SIGCOMM'97 Conference, Cannes, France, Sep. 1997.

Anderson et al., "Persistent Linda: Linda + Transactions + Query Processing," Proceedings of the 13th Symposium on Fault Tolerant Systems, pp. 93-109, 1991.

Anonymous, "Change-Notification Service for Shared Files," IBM Technical Disclosure Bulletin, vol. 36, No. 8, pp. 77-82, XP002108713, New York, US, Aug. 1993.

Anonymous, "Resource Preemption for Priority Scheduling," IBM Technical Disclosure Bulletin, vol. 16, No. 6, p. 1931, XP002109435 New York, US, Nov. 1973.

Beech et al., "Object Databases as Generalizations of Relational Databases," Computer Standards & Interfaces, vol. 13, Nos. 1/3, pp. 221-230, Amsterdam, NL, Jan. 1991.

Bertino et al., "Object-Oriented Database Management Systems: Concepts and Issues," Computer, vol. 24, No. 4, pp. 33-47, Los Alamitos, CA, Apr. 1991.

Betz et al., "Interoperable Objects: Laying the Foundation for Distributed Object Computing," Dr. Dobb's Journal, vol. 19, No. 11, p. 18(13), Oct. 1994.

Bevan et al., "An Efficient Reference Counting Solution To The Distributed Garbage Collection Problem," Parallel Computing, NL, Elsevier Science Publishers, Amsterdam, vol. 9, No. 2, pp. 179-192, Jan. 1989.

Birrell et al., "Distributed Garbage Collection for Network Objects," Digital Systems Research Center, No. 116, pp. 1-18, Dec. 15, 1993.

Birrell et al., "Grapevine: An Exercise in Distributed Computing," Communications of the ACM, vol. 25, No. 4, pp. 260-274, Apr. 1982.

Birrell et al., "Implementing Remote Procedure Calls," ACM Transactions on Computer Systems, vol. 2, No. 1, pp. 39-59, Feb. 1984.

Birrell et al., "Network Objects," DEC SRC Research Report 115, Feb. 28, 1994.

Birrell et al., "Network Objects," Operating Systems Review, vol. 27, No. 5, pp. 217-230, Dec. 1993.

Burns et al., "An Analytical Study of Opportunistic Lease Renewal, "Distributed Computing Systems, IEEE 21st International Conference, pp. 146-153, Apr. 2000.

Cannon et al., "Adding Fault-Tolerant Transaction Processing to LINDA," Software-Practice and Experience, vol. 24(5), pp. 449-466, May 1994.

Cardelli, "Obliq, A Lightweight Language For Network Objects," Digital SRC, pp. 1-37, Nov. 5, 1993.

Carriero et al., "Distributed Data Structures in Linda," Principles of Programming Language, pp. 1-16, 1986.

Carriero et al., "Distributed Data Structures in Linda," Yale Research Report YALEU/DCS/RR-438, Nov. 1985.

Chung et al., "A 'Tiny' Pascal Compiler: Part 1: The P-Code Interpreter," BYTE Publications, Inc., Sep. 1978.

Chung et al., "A 'Tiny' Pascal Compiler: Part 2: The P-Compiler," BYTE Publications, Inc., Oct. 1978.

Coulouris et al., "Distributed Systems Concepts and Designs," Second Ediition, Addison-Wesley, 1994.

Dave et al., "Proxies, Application Interface, And Distributed Systems," Proceedings International Workshop On Object Orientation In Operating Systems, pp. 212-220, Sep. 24, 1992.

Deux et al., "The O2 System," Communications Of The Association For Computing Machinery, vol. 34, No. 10, pp. 34-48, Oct. 1, 1991.

Dijkstra, "Self-stabilizing Systems in Spite of Distributed Control," Communications of the ACM, vol. 17, No. 11, pp. 643-644, Nov. 1974.

Dolev et al., "On the Minimal Synchronism Needed for Distributed Consensus," Journal of the ACM, vol. 34, No. 1, pp. 77-97, Jan. 1987.

Dollimore et al., "The Design of a System for Distributing Shared Objects," The Computer Journal, No. 6, Cambridge, GB, Dec. 1991.

Dourish, "A Divergence-Based Model of Synchrony and Distribution in Collaborative Systems," Xerox Technical Report EPC-1194-102, pp. 1-10, 1994.

Drexler et al., "Incentive Engineering for Computational Resource Management," The Ecology of Computation, Elsevier Science Publishers B.V., pp. 231-266, 1988.

Droms, "RFC 1541 Dynamic Host Configuration Protocol," <http://www.cis.ohio-state.edu/htbin/rfc/rfc1541.html>, pp. 1-33, Oct. 1993.

Emms, "A Definition Of An Access Control Systems Language," Computer Standards And Interfaces, vol. 6, No. 4, pp. 443-454, Jan. 1, 1987.

Fleisch et al., "High Performance Distributed Objects Using Distributed Shared Memory & Remote Method Invocation," System Sciences, 1998, Proceedings of the 31st Hawaii Internat'l. Conference, Jan. 6-9, 1998, pp. 574-578.

Gelernter et al., "Parallel Programming in Linda," Yale University, pp. 1-21, Jan. 1985.

Gelernter, "Generative Communication in Linda," ACM Transactions on Programming Languages and Systems, vol. 7, No. 1, pp. 80-112, Jan. 1985.

Gosling et al., "The Java (TM) Language Specification," Addison-Wesley, 1996.

Gottlob et al., "Extending Object-Oriented Systems with Roles," ACM Transactions On Information Systems, vol. 14, No. 3, pp. 268-296, Jul. 1996.

Gray et al., "Leases: An Efficient Fault-Tolerant Mechanism for Distributed File Cache Consistency," ACM, pp. 202-210, 1989.

Gray et al., "Leases: An Efficient Fault-Tolerant Mechanism for Distributed File Cache Consistency," Proceedings of the 12th ACM Symposium on Operating Systems Principles, pp. 202-210, 1989.

Guth, "JavaOne: Sun to Expand Java Distributed Computing Effort," <http://www.sunworld.com/swol-02-1998/swol-02-sun-spots.html>, XP-002109935, p. 1, Feb. 20, 1998.

Guyennet et al., "A New Consistency Protocol Implemented in the CAliF System," IEEE, 1094-7256/97, pp. 82-87, 1997.

Guyennet et al., "Distributed Shared Memory Layer for Cooperative Work Applications," IEEE, 0742-1303/97, pp. 72-78, 1997.

Hamilton et al., "Subcontract: A Flexible Base For Distributed Programming," Proceedings of 14th Symposium of Operating System Principles, Dec. 1993.

Hamilton, "Java and the Shift to Net-Centric Computing," Computer, pp. 31-39, Aug. 1996.

Harris et al., "Proposal for a General Java Proxy Class for Distributed Systems and Other Uses," Netscape Communications Corp., Jun. 25, 1997.

Hartman et al., "Liquid Software: A New Paradigm For Networked Systems," Technical Report 96-11, Department of Comp. Sci., Univ. of Arizona, Jun. 1996.

Howard et al., "Scale and Performance in a Distributed File System," ACM Transactions on Computer Systems, vol. 6, No. 1, pp. 51-81, Feb. 1988.

Hoshi et al., "Allocation of the Cross-Connect Function in Leased Circuit Networks," 1992, ICC' 92, Conference record, SUPERCOMM/ICC 92, A New World of Communications, IEEE International Conference, pp. 1408-1412.

Hunt, "IDF: A Graphical Data Flow Programming Language for Image Processing and Computer Vision," Proceedings of the International Conference on Systems, Man, and Cybernetics, pp. 351-360, Los Angeles, Nov. 4-7, 1990.

IBM (TM) Technical Disclosure Bulletin, "Object Location Algorithm," vol. 36, No. 09B, pp. 257-258, Sep. 1993.

IBM (TM) Technical Disclosure Bulletin, "Retrieval of Qualified Variables Using Extendible Hashing," vol. 36, No. 12, pp. 301-303, Dec. 1993.

IBM Technical Disclosure Bulletin, "Local Network Monitoring to Populate Access Agent Directory," vol. 36, No. 09A, pp. 403-405, Sep. 1993.

IBM, "Chapter 6—Distributed SOM (DSOM)," SOMobjects Developer Toolkit Users Guide, Version 2.1, pp. 6-1-6-90, Oct. 1994.

Jaworski, "Java 1.1 Developer's Guide, 2nd Edition," Sams.net, 1997.
Jones et al., "Garbage Collection: Algorithms for Automatic Dynamic Memory Management," pp. 165-175, John Wiley & Sons, 1996.
Kambhatla et al., "Recovery with Limited Replay: Fault-Tolerant Processes in Linda," Oregon Graduate Institute, Technical Report CSIE 90-019, pp. 1-16, Sep. 1990.
Kay et al., "An Overview of the Raleigh Object-Oriented Database System," ICL Technical Journal, vol. 7, No. 4, pp. 780-798, Oxford, GB, Nov. 1991.
Kougiouris et al., "Support for Space Efficient Object Invocation in Spring," Sep. 1994.
Krasner, "The Smalltalk-80 Virtual Machine," BYTE Publications Inc., pp. 300-320, Aug. 1991.
Lamport et al., "The Byzantine Generals Problem," ACM Transactions on Programming Languages and Systems, vol. 4, No. 3, pp. 382-401, Jul. 1982.
LINDA Database Search, pp. 1-68, Jul. 20, 1995.
Lindholm et al., "The Java (TM) Virtual Machine Specification," Addison Wesley, 1996.
Liskov et al., "Distributed Object Management in Thor," International Workshop on Distributed Object Management, p. 12, 1992.
McDaniel, "An Analysis of a Mesa Instruction Set," Xerox Corporation, May 1982.
McGrath, "Discovery and Its Discontents: Discovery Protocols for Ubiquitous Computing," Presented at Center for Excellence in Space Data and Information Science, NASA Goddard Space Flight Center, Apr. 5, 2000.
Mitchell et al., "An Overview of the Spring System," Feb. 1994.
Mitchell et al., "Mesa Language Manual," Xerox Corporation, Palo Alto Research Center, 1978.
Mullender, "Distributed Systems," Second Edition, Addison-Wesley, 1993.
Mummert et al., "Long Term Distributed File Reference Tracing: Implementation and Experience," Carnegie Mellon University School of Computer Science, pp. 1-28, Nov. 1994.
Mux-Elektronik, Java 1.1 Interactive Course, www.lls.se/~mux/javaic.html, 1995.
Operating Systems Review, ACM Press, vol. 27, No. 5, Dec. 1993, pp. 217-230.
Orfali et al., "The Essential Distributed Objects Survival Guide," Chapter 11: Corba Commercial ORBs, pp. 203-215, John Wiley & Sons, Inc., 1996.
Ousterhout et al., "The Sprite Network Operating System," Computer, IEEE, pp. 23-36, Feb. 1988.
Pier, "A Retrospective on the Dorando, A High-Performance Personal Computer," IEEE Conference Proceedings, The 10th Annual International Symposium on Computer Architecture, 1983.
Pier, "A Retrospective on the Dorando, A High-Performance Personal Computer," Xerox Corporation, Aug. 1983.
Pinakis, "Using Linda as the Basis of an Operating System Microkernel," University of Western Australia, Department of Computer Science, pp. 1-165, Aug. 1993.
Riggs et al., "Pickling State in the Java (TM) System," USENIX Association Conference on Object-Oriented Technologies and Systems, XP-002112719, pp. 241-250, Jun. 17-21, 1996.
Rosenberry et al., "Understanding DCE," Chapters 1-3, 6, 1992.
Sharrott et al., "ObjectMap: Integrating High Performance Resources into a Distributed Object-oriented Environment," ICODP, 1995.
Stevenson, "Token-Based Consistency of Replicated Servers," IEEE, CH2686-4/89/0000/0179, pp. 179-183, 1989.
Thompson, "Regular Expression Search Algorithm," Communications of the ACM, vol. II, No. 6, p. 149 et seq., Jun. 1968.
Venners, "Jini Technology, Out of the Box," JAVAWORLD, 'Online!, pp. 1-4, Dec. 1998.
Waldo et al., "Events In An RPC Based Distributed System," Proceedings Of The 1995 USENIX Technical Conference, Proceedings USENIX Winter 1995 Technical Conference, New Orleans, LA, USA, 16-20, pp. 131-142, Jan. 1995.
Wilson et al., "Design of the Opportunistic Garbage Collector," Proceedings of the Object Oriented Programming Systems Languages And Applications Conference, New Orleans, vol. 24, No. 10, Oct. 1989.
Wolrath et al., "A Distributed Object Model for the Java™ System," USENIX Association, Conference on Object-Oriented Technologies & Systems, Jun. 17-21, 1996.
Wu, "A Type System For An Object-Oriented Database System," Proceedings of the International Computer Software and Applications Conference (COMPSAC), Tokyo, Japan, pp. 333-338, Sep. 11-13, 1991.
Yemini et al., "Towards Programmable Networks," IFIP/IEEE International Workshop on Distributed Systems: Operations and Management, L'Aquila, Italy, Oct. 1996.
Yin et al., "Using Leases to Support Server-Driven Consistency in Large-Scale Systems," Computer Services Department, University of Texas at Austin, p. 285-294, May 26-29, 1998.
Yin et al., "Volume Leases for Consistency in Large-Scale Systems," IEEE Transactions on Knowledge & Data Engineering, vol. 11, No. 4, pp. 563-576, Jul./Aug. 1999.
Auto-ID Center, "Auto-ID Savant Specification 1.0," Version of Oct. 1, 2003 (58 pages).
Cary G. Gray and David R. Cheriton, "Leases: An Efficient Fault-Toleratn Mechanism for Distributed File Cache Consistency", 1989, ACM, pp. 202-210.
H.A. Smith and J.D. McKeen, "Object-Oriented Technology: Getting Beyond the Hype", ACM, Spring 1996, vol. 27, pp. 20-22.
Java™ Remote Method Invocation Specification, JDK 1.1 FCS, Sun Microsystems, Inc. Feb. 1997, chapters 5 and 7.
Jennings, N.R. et al., "Using Intelligent Agents to Manage Business Processes," Dept. Electronic Engineering, Queen Mary & Westfield College, Mile End Road, London, E1 4NS, U.K., XP-002254546, 1996 (pp. 345-360).
Dave et al., Proxies, Application Interfaces, and Distributed Systems, IEEE, pp. 212-220, 1992.
Wollrath et al., "Java-Centric Distributed Computing," IEEE Micro, pp. 44-53, 1997.
"Dynamic code downloading using RMI", http://java.sun.com/j2se/1.4.2/docs/guide/rmi/codebase.html, 2003.
"Passing Proxies as Parameters to Methods and Return Values from Methods", IBM Technical Disclosure Bulletin, vol. 41, No. 1, Jan. 1998, pp. 89-92.
Anonymous, "Jini™ Distributed Leasing Specification", Sun Microsystems, Jan. 1999, XP-002209076.
Li, Sing et al., "Professional Jini", Chapter 7, Aug. 2000.
Spiteri, M.D. et al., "An architecture to support storage and retrieval of events", 1998.
Stoyenko, Alexander, "SUPRA-RPC: SUbprogram PaRAmeters in Remote Procedure Calls," Software Practice and Experience, vol. 24, No. 1, Jan. 1994, pp. 27-49.
Subramanian, Sakthi et al., "Automatic Verification of Object Code Against Source Code," IEEE, 1996, pp. 46-55.
Wollrath, Ann et al., "Simple Activation for Distributed Objects", Proceedings of the Usenix Conference, Jun. 26, 1995, pp. 1-11.
Plainfosse, D., et al., "A Survey of Distributed Garbage Collection Techniques", http://citeseer.nj.nec.com/plainfosse95survey.html, Sep. 1995, pp. 1-33, XP002126410.
Laura Lemay, Charles L. Perkins, Michael Morrison: "Teach Yourself Java in 21 Days, Professional Reference Edition"1996, (pp. 427-445) SAMS.NET Publishing, Indianapolis, Indiana.

* cited by examiner

METHOD AND APPARATUS FOR DYNAMIC DISTRIBUTED COMPUTING OVER A NETWORK

This application is a continuation of application Ser. No. 09/030,840, filed Feb. 26, 1998, now U.S. Pat. No. 6,446,070, which is incorporated herein by reference.

BACKGROUND OF THE INVENTION

1. Field of the Invention

This invention generally relates to distributed computing systems and more particularly, to a method and apparatus for performing dynamic distributed computing over a network.

2. Description of the Related Art

In a distributed computing network, users can harness the processing capabilities of numerous computers coupled to the network. Tasks with many different independent calculations can be quickly processed in parallel by dividing the processing among different computers on the network. Further, specialized tasks can be computed more quickly by locating a computer on the network most suitable for processing the data. For example, a task executing on a client system which performs an intense floating point calculation may execute faster on a server system coupled to the network which has specialized floating point hardware suitable for the particular calculations.

Unfortunately, conventional techniques for distributed computing are not easily implemented in the typical heterogenous computing environments. Each computer on the network is typically heterogeneous containing different processor and operating system combinations, and require different object modules for execution. On the client side, different object modules requires that the user compiles different versions of the task for each different platform and loads the module onto the corresponding platform adding storage requirements to each client and also requiring porting and compiling the same tasks multiple times. Further, conventional techniques require that the code be distributed over the computers well before the code is executed. In the conventional systems, the extensive preparation required for performing distributed computing deterred many from exploiting this technology.

Distributed computing systems based on scripting languages are an improvement over some conventional distributed computing systems. Unfortunately, scripting based systems eliminate the need to recompile code, but are still very inefficient. A scripting based distributed system can execute the same instructions on multiple platforms because the language is interpreted by an interpreter located on each system. Consequently, most scripting languages are slow since they must translate high level scripting instructions into low level native instructions in real time. Moreover, scripting languages are hard to optimize and can waste storage space since they are not generally compressed.

Based on the above limitations found in conventional systems, it is desirable to improve distributed computing systems.

SUMMARY OF THE INVENTION

In one aspect of the present invention associated with a client computer, a method and apparatus for dynamic distributed computing is provided. Initially, the client selects a server from the network to process the task. This selection can be based on the availability of the server or the specialized processing capabilities of the server. Next, a client stub marshals the parameters and data into a task request. The client sends the task request to the server which invokes a generic compute method. The server automatically determines if the types associated with the task are available on the server and downloads the task types from the network as necessary. Information in the task types are used to extract parameters and data stored in the particular task request. The generic compute method is used to execute the task request on the selected server. After the server processes the task request, the client receives the results, or the computed task, back from the selected server.

In another aspect of the present invention associated with a server computer, a method and apparatus for dynamic distributed computing is provided. Initially, the server will automatically determine which task types are available on the server and will download task types from the network as necessary. These task types help the server unmarshal parameters and data from a task request and generate a local task. Next, the server invokes a generic compute method capable of processing all types of compute tasks or subtypes of a compute task. The generic compute method is used to execute the task request on the selected server. If a subsequent task will use the results, the server stores the results from the computed tasks in a local cache. Once the task has completed, the server returns the results, or the computed task, to the client.

BRIEF DESCRIPTION OF THE DRAWINGS

The accompanying drawings, which are incorporated in and constitute a part of this specification, illustrate an embodiment of the invention and, together with the description, serve to explain the advantages, and principles of the invention.

In the drawings.

DETAILED DESCRIPTION OF THE INVENTION

Introduction

Figure 1:
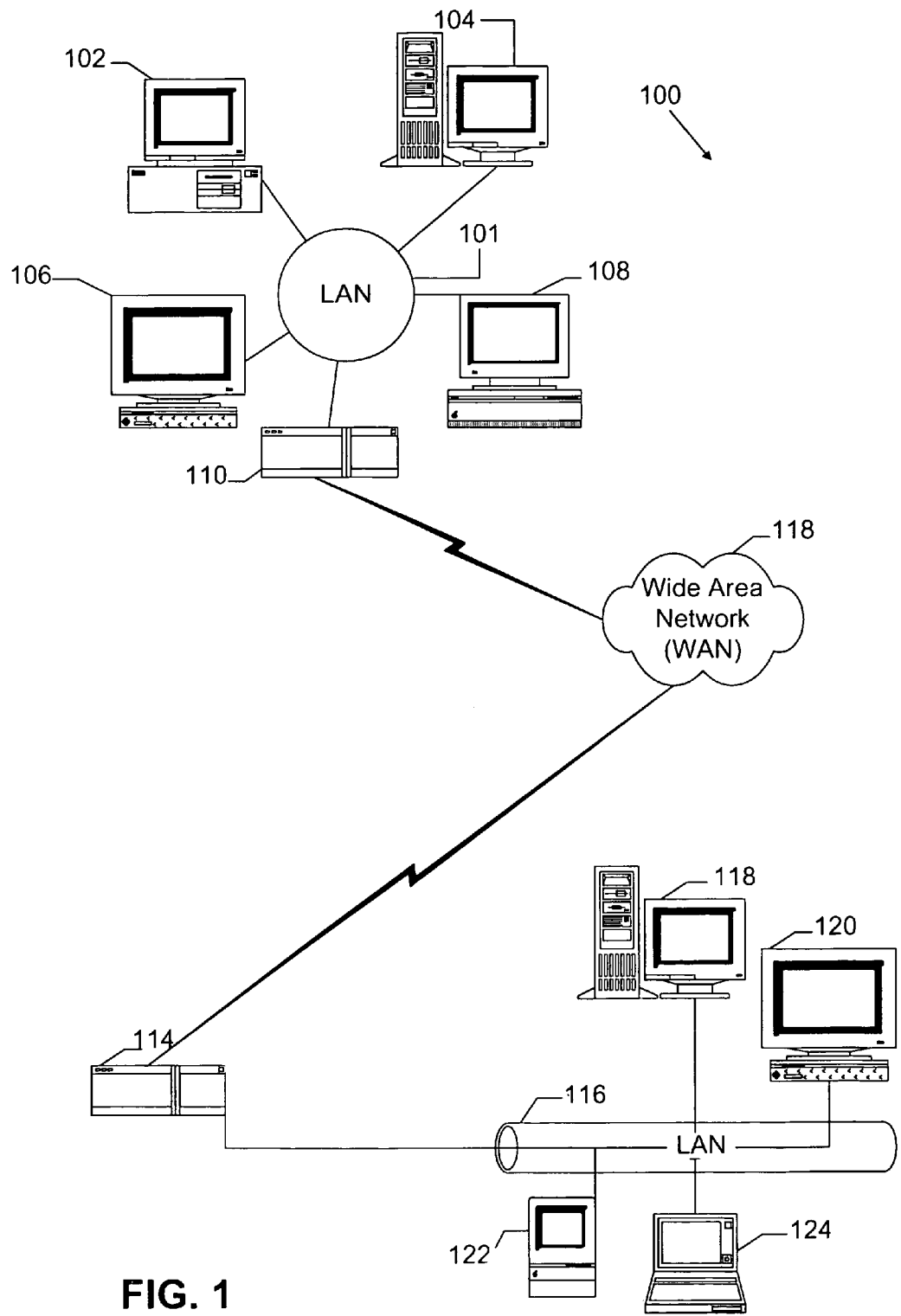
FIG. 1. illustrates a network suitable for use with methods and systems consistent with the present invention.

Reference will now be made in detail to an implementation of the present invention as illustrated in the accompanying drawings. Wherever possible, the same reference numbers will be used throughout the drawings and the following description to refer to the same or like parts.

Systems consistent with the present invention address shortcomings of the prior art and provide a dynamic distributed computing system used over a network of server computers. This dynamic distributed computing system is particularly useful in heterogenous computer networks having computers with different processors, different operating systems, and combinations thereof. Such a system allows a client application to select a server computer at runtime to execute a particular task. In method and systems consistent with the present invention, the task is an object having a particular type or class definition. The server can generally defer knowing the actual class definition until the parameters and data associated with the object task are received on the server. Consequently, the particular type is downloaded by the server if it is not available on the server. For example, if an object instance of an unknown class is transmitted to the server, the server downloads the unknown class. The server then uses this class to process the object. This late association of a class definition to an object increases the flexibility in processing complex tasks over a network of server computers. Further, the present design facilitates this flexibility with minimal additional overhead by utilizing features in existing remote procedure call subsystems such as the Remote Method Invocation (RMI) subsystem developed by Sun Microsystems, Inc. of Mountain View, Calif. For more information on Remote Method Invocation (RMI) see co-pending U.S. Patent Application, "System and Method For Facilitating Loading of "Stub" Information to Enable a Program Operating in One Address Space to Invoke Processing of a Remote Method or Procedure in Another Address Space" having Ser. No. 08/636,706, filed Apr. 23, 1996, now U.S. Pat. No. 6,938,263, by Ann M. Wollrath, James Waldo, and Roger Riggs, assigned to a common assignee and hereby incorporated by reference. Also, RMI is described in further detail in the "Java (™) Remote Method Invocation Specification," available on the JavaSoft WebPage provided by Sun Microsystems, Inc. which is also hereby incorporated by reference.

Unlike conventional systems, a task in the dynamic distributed system consistent with the present invention can be written once and executed on any server computer in a network. This capability is particularly advantageous in a heterogeneous network because the task does not have to be ported to every platform before it is executed. Instead, a generic compute task designed in accordance with the present invention is loaded on each system. This generic compute task is capable of executing a wide variety of tasks specified by the client at runtime. For example, one can develop a type called "Compute" and a generic compute task which accepts the "Compute" type in an object-oriented language, such as Java. Java is described in many texts, including one that is entitled "The Java Language Specification" by James Gosling, Bill Joy, and Guy Steele, Addison-Wesley (1996), which is hereby incorporated by reference. The client creates a task having a subtype of the type "Compute" and passes an object corresponding to task to the generic compute task on the server. A remote procedure call mechanism downloads the object to the server and the generic compute task which executes the task.

In Java, the task transmitted by the client is actually an object including a series of bytecodes. These bytes codes can be executed immediately as long as the server implements a Java Virtual Machine (JVM). The JVM can be implemented directly in hardware or efficiently simulated in a software layer running on top of the native operating system. The Java language was designed to run on computing systems with characteristics that are specified by the Java Virtual Machine (JVM) Specification. The JVM specification is described in greater detail in Lindholm and Yellin, *The Java Virtual Machine Specification*, Addison-Wesley (1997), which is hereby incorporated by reference. This uniform JVM environment allows homogeneous execution of tasks even though the computer systems are heterogenous and have different processors, different operating systems, and combinations thereof. Combining a powerful remote procedure call subsystem with a generic compute task on the server, designed in accordance with the present invention, results in a powerful dynamic distributed computing environment.

A compute server using bytecodes can process a task much faster than systems using conventional text based scripting languages or other character based languages. Each bytecode is compact (8 bits) and is in a numeric format. Consequently, the server computer does not spend compute cycles parsing the characters and arguments at run time. Also, the bytecodes can be optimized on the client before transporting them to the server. The server optionally can convert the bytecodes to native instructions for execution directly on the hardware at run time using a processing mechanism such as a Just-in-Time (JIT) compiler. For more information on JIT compilers see *The Java Virtual Machine Specification*.

A system designed in accordance with the present invention assumes that each client is capable of communicating to each server over a common networking protocol such as TCP/IP. Also, it is assumed that there is a remote procedure call (RPC) subsystem on the client and server which is capable of receiving remote requests from a client and executing them on the server. This RPC system also automatically downloads code and related information needed for performing the task at run time. RMI developed by Sun Microsystems, Inc. is a suitable RPC subsystem providing these features. One skilled in the art, however, will appreciate that other RPC subsystems, such as DCOM/COM from Microsoft, Inc., may be used in lieu of RMI.

Computer Network

FIG. 1 illustrates a network 100 in which one embodiment of the present invention can be implemented. Network 100 includes Local Area Network (LAN) 101, backbone or Wide Area Network (WAN) 112, and Local Area Network (LAN) 116 in its essential configuration. LAN 101 includes a series of work stations and server computers 102, 104, 106, and 108. LAN 116 includes a series of work stations and server computers 118, 120, 122, and 124. These computer systems 102–108 and 118–124 are coupled together to share information, transmit data, and also share computational capabilities. LAN 101 is coupled to the larger overall network using a network interconnect device 110. The specific type of network interconnect device can be a router, a switch, or a hub depending on the particular network configuration. In general, network interconnect device 110 includes routers, switches, hubs or any other network interconnect device capable of coupling together a LAN 101, a WAN 112, and LAN 116 with user terminals into an integrated network. Network interconnect device 114 can also include routers, switches, hubs, or any other network interconnect device capable of coupling the computers on LAN 116 with user terminals into an integrated network. In general, a dynamic distributed computing system designed in accordance with the present invention is typically located on each computer system coupled to network 100. Accordingly, each computer may operate as either a client or a server depending on the particular request being made and the services being provided. Typically, the client requests that a task is computed on a server computer and the server computer will process the task.

Computer System

Figure 2:
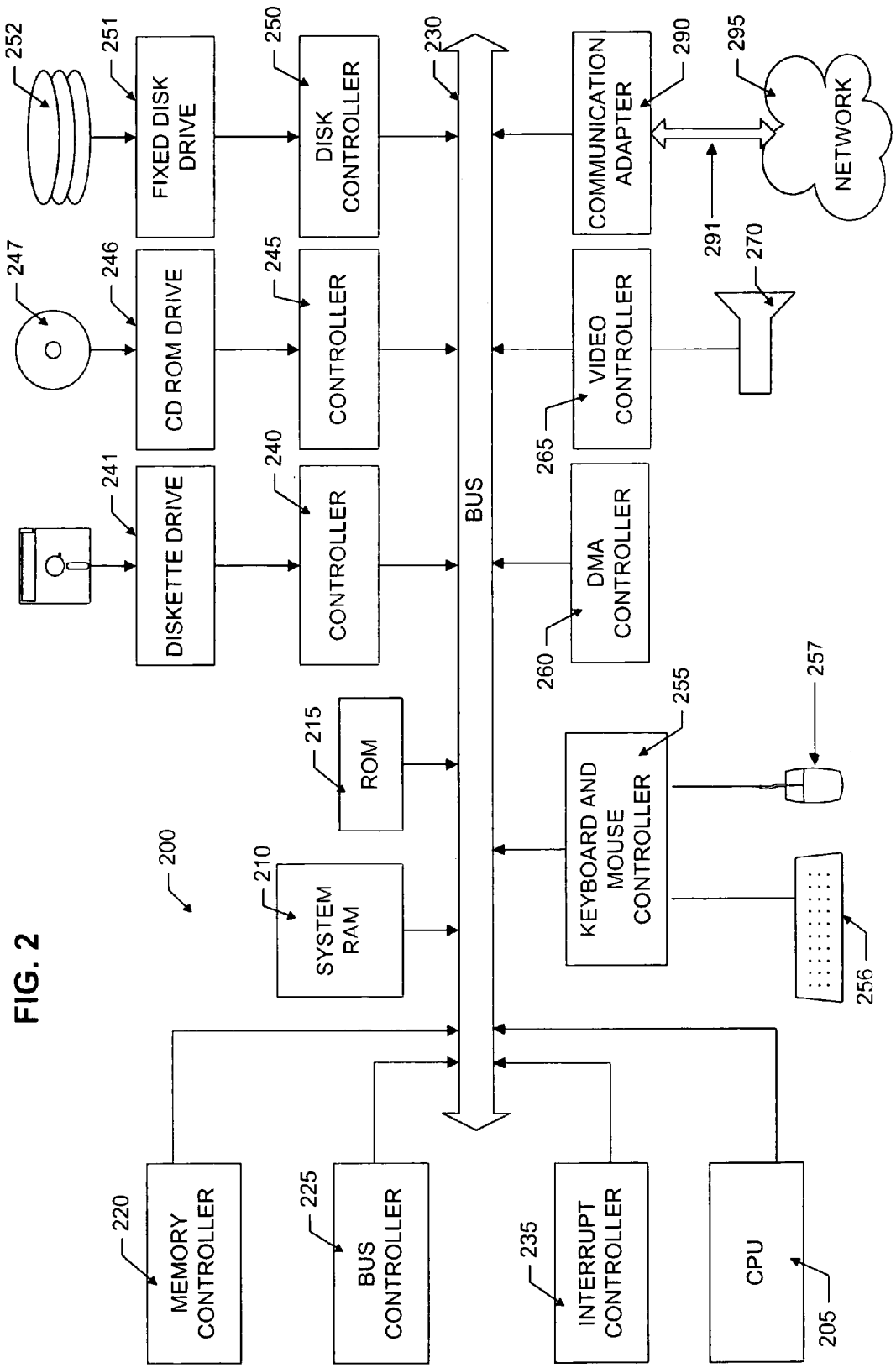
FIG. 2 is block diagram of a computer system suitable for use with methods and systems consistent with the present invention.

Referring now to FIG. 2, the system architecture for a computer system 200 suitable for practicing methods and systems consistent with the present invention is illustrated. The exemplary computer system 200 is for descriptive purposes only. Although the description may refer to terms commonly used in describing particular computer systems, such as in IBM PS/2 personal computer, the description and concepts equally apply to other computer systems, such as network computers, workstation, and even mainframe computers having architectures dissimilar to FIG. 1.

Furthermore, the implementation is described with reference to a computer system implementing the Java programming language and Java Virtual Machine specifications, although the invention is equally applicable to other computer systems having similar requirements. Specifically, the present invention may be implemented with both object-oriented and nonobject-oriented programming systems.

Computer system 200 includes a central processing unit (CPU) 105, which may be implemented with a conventional microprocessor, a random access memory (RAM) 210 for temporary storage of information, and a read only memory (ROM) 215 for permanent storage of information. A memory controller 220 is provided for controlling RAM 210.

A bus 230 interconnects the components of computer system 200. A bus controller 225 is provided for controlling bus 230. An interrupt controller 235 is used for receiving and processing various interrupt signals from the system components.

Mass storage may be provided by diskette 242, CD ROM 247, or hard drive 252. Data and software may be exchanged with computer system 200 via removable media such as diskette 242 and CD ROM 247. Diskette 242 is insertable into diskette drive 241 which is, in turn, connected to bus 230 by a controller 240. Similarly, CD ROM 247 is insertable into CD ROM drive 246 which is, in turn, connected to bus 230 by controller 245. Hard disk 252 is part of a fixed disk drive 251 which is connected to bus 230 by controller 250.

User input to computer system 200 may be provided by a number of devices. For example, a keyboard 256 and mouse 257 are connected to bus 230 by controller 255. It will be obvious to those reasonably skilled in the art that other input devices, such as a pen and/or tablet may be connected to bus 230 and an appropriate controller and software, as required. DMA controller 260 is provided for performing direct memory access to RAM 210 A visual display is generated by video controller 265 which controls video display 270.

Computer system 200 also includes a communications adaptor 290 which allows the system to be interconnected to a local area network (LAN) or a wide area network (WAN), schematically illustrated by bus 291 and network 295.

Operation of computer system 200 is generally controlled and coordinated by operating system software. The operating system controls allocation of system resources and performs tasks such as processing scheduling, memory management, networking, and services, among things.

Dynamic Distributed Computing

Dynamic distributed computing is generally a client server process. The client-server relationship is established for each call being made and generally the roles can change. Typically, the client is defined as the process making a call to request resources located or controlled by the server. In this context, the computer or processor executing the requesting process may also be referred to as a client. However, these roles may change depending on the context of information and particular processing which is taking place.

Figure 3:
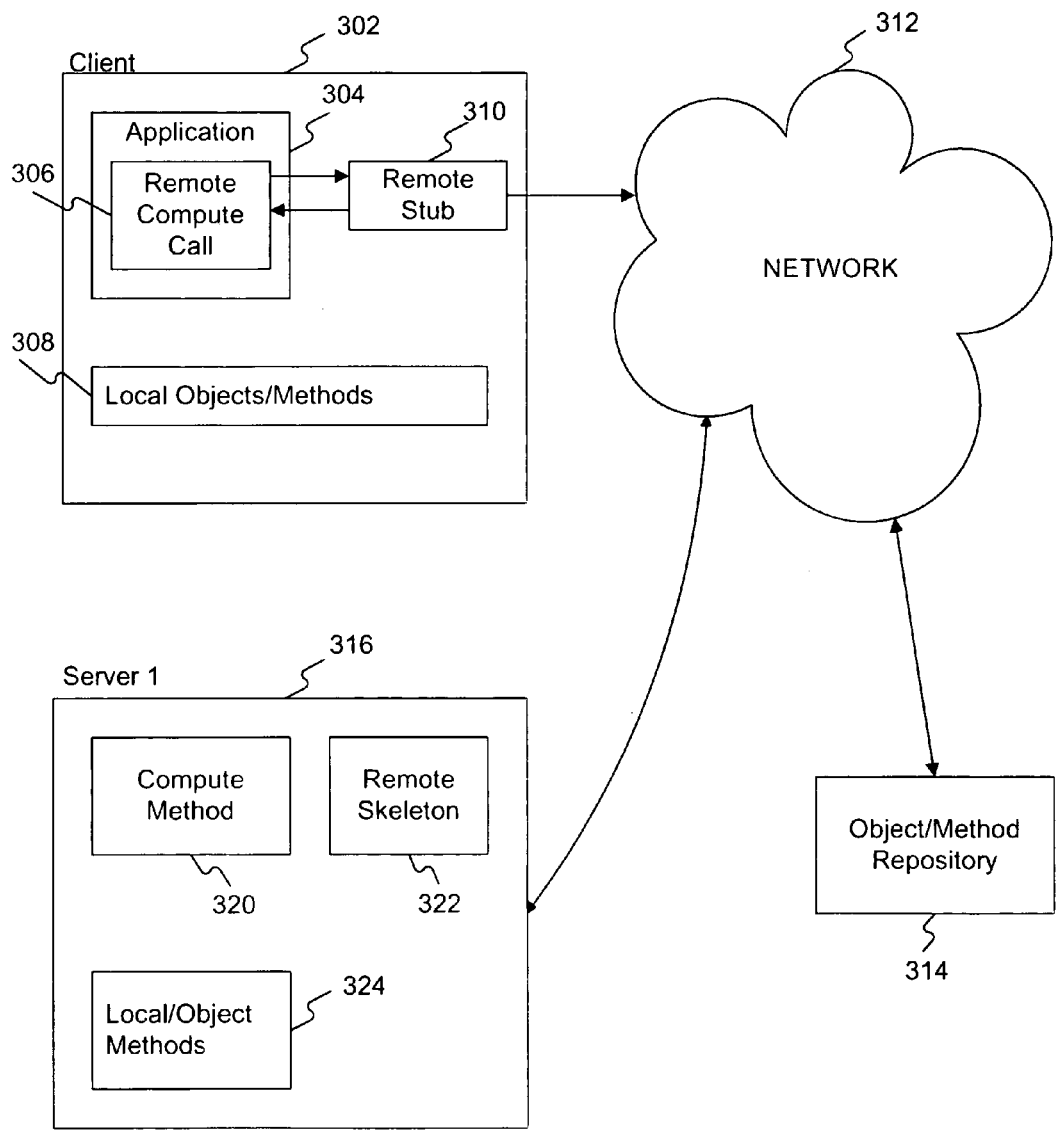
FIG. 3 is a block diagram representation of a client-server networking environment suitable for use with methods and systems consistent with the present invention.

FIG. 3 is a block diagram representation of a client-server networking environment used to implement one embodiment of the present invention. This diagram includes those subsystems closely related to the present invention to emphasize one embodiment of the present invention. Additional subsystems, excluded in FIG. 3, may be necessary depending on the actual implementation.

Accordingly, FIG. 3 includes a client 302, a server 316, and an object/method repository 314 which are all operatively coupled to a network 312. Client 302 includes an application 304 which makes a remote compute call 306 to process a task on a remote server computer. A remote stub 310, typically generated using a remote procedure call subsystem, as described in the RMI specification, is used to package parameters and data associated with the specific remote compute call 306. The typical client can also includes a collection of local objects/methods 308 which may contain the type of task client 302 calls remote compute call 306 to execute. Alternatively, the tasks can be located in object method repository 314 and are accessed by compute method 320 as needed. Server 316 includes a remote skeleton 322 to unmarshal the parameters and data transmitted from the client. Remote skeleton 322 prepares information for use by compute method 320. A local objects/methods 324 also includes tasks client 302 can ask the server 316 to process.

In operation, remote compute call 306 makes a call to a compute method 320 to process a particular task. A remote stub 310 marshals information on the calling method so that a compute method 320 on server 316 can execute the task. Remote stub 310 may also marshal basic parameters used as arguments by compute method 320 on server 302. Remote skeleton 322 receives the task and unmarshals data and parameters received over the network and provides them to compute method 320. If the task and related types are not available on server 316, the skeleton downloads the types from client 302, object/method repository 314, or some other safe and reliable source of the missing types. The type information maps the location of data in the object and allows the remote skeleton to complete processing the object. RMI (not shown) is one remote procedure call (RPC) system capable of providing remote stub 310 and remote skeleton 322. Once the object is processed by the skeleton, compute method 320 executes the task and returns the computed task or computed task results to client 302.

Figure 4:
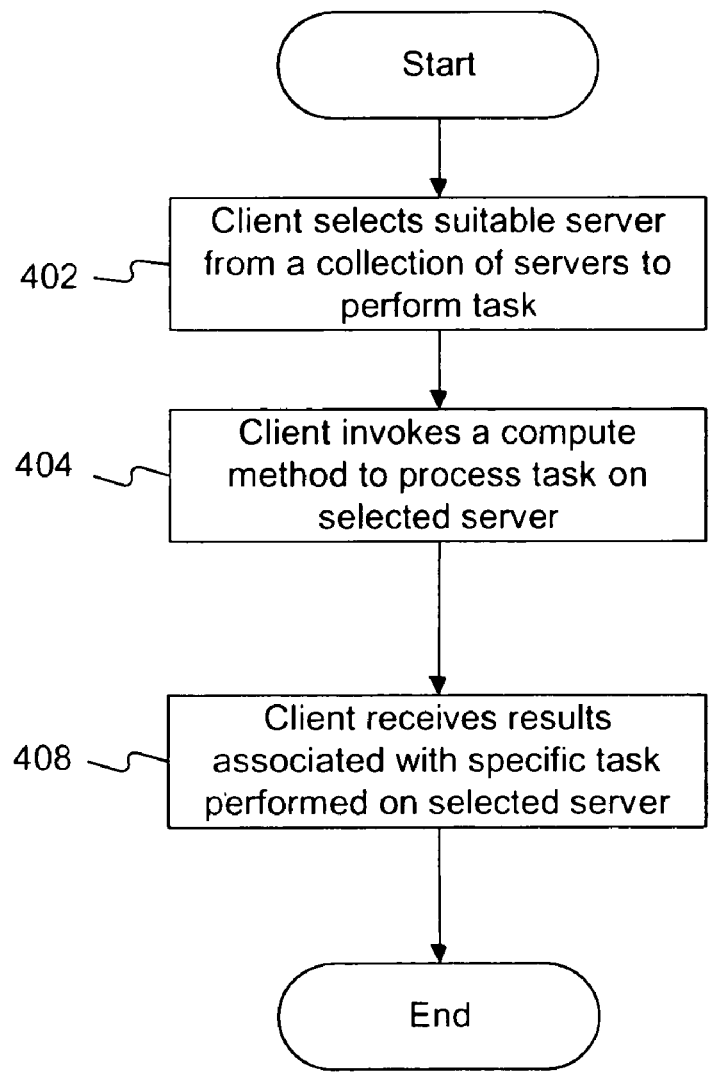
FIG. 4 is a flow chart of the steps a client performs in accordance with methods and systems consistent with the present invention.

FIG. 4 is a flow chart of the steps performed by a client when utilizing the dynamic distributed computing system and method consistent with the present invention. Initially, the client selects a suitable server from the network to process the task (step 402). The selection criteria can be based upon the overall processing load distribution among the collection of server computers or the specialized computing capabilities of each server computer. For example, load balancing techniques may be used to automatically determine which computer has the least load at a given moment. Further, some computers having specialized hardware, such as graphic accelerators or math co-processors, may be selected by the client because the task has intense graphic calculations, such as rendering three dimensional wireframes, or must perform many floating point calculations.

Once the server is selected, the client invokes a remote compute method on the selected server (step 404). An RPC system, such as RMI, facilitates invoking the remote compute method on a server computer. Typically, the client need only know that the remote compute method can be used as a conduit to process a particular task on a remote computer. For example, in Java the remote instruction "Server.runTask (new PI(1000))" executed on a client causes a remote method "runTask" to be invoked on a remote server "Server" of type "ComputeServer". This step provides the task (in this case the task is a type task object instantiated by the "new PI(1000)) as a parameter to the generic compute method through the remote method "runTask". The "runTask" method on the server implements a Compute remote interface. Optionally, this instruction can indicate to the server that results from the computed task should be stored in a result cache on the selected server. This enables subsequent tasks to share the results between iterations. For example, the results from calculating "PI" may be used later by another remote method to compute the volume of a sphere or perform another precise calculation using the value of "PI".

A stub is used to marshal parameters and data into a task request. The task request is then provided to the selected server. Typically, the task request includes data and parameters for the task as well as a network location for the type or class if it is not present on the server. A skeleton on the server uses the type or class information to process the object and unmarshall data and parameters. In a system using Java and RMI, the task request is an object and the class location information is contained in a codebase URL (universal record locator) parameter. Further details on this are contained in the RMI Specification. The server can schedule the task for execution immediately or whenever the server finds a suitable time for executing the task. After the server performs the computation, the client receives the results from the computed task (step 408).

Figure 5:
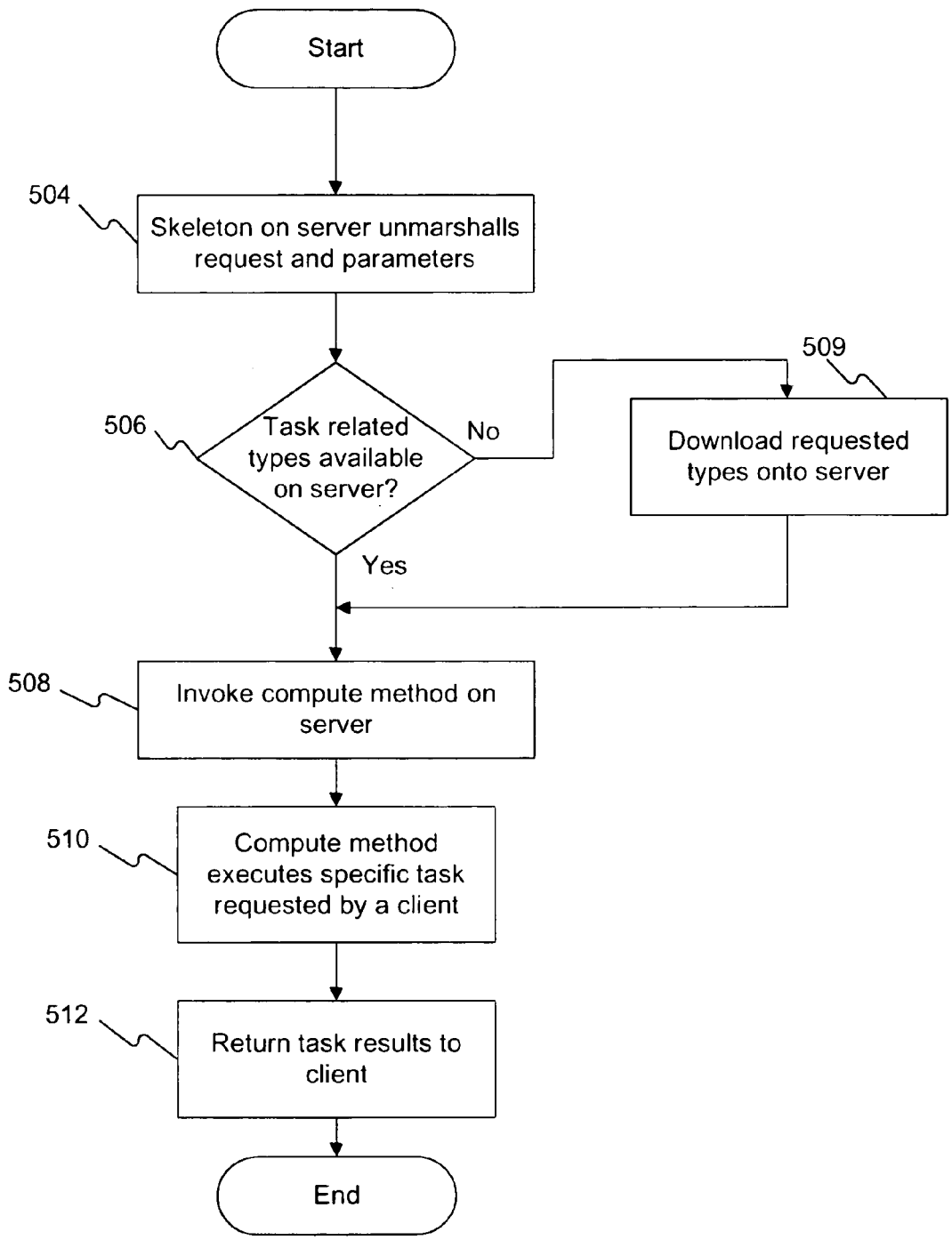
FIG. 5 is a flow chart the steps performed by a server in accordance with methods and systems consistent with the present invention.

FIG. 5 is a flow chart of the steps performed by the dynamic distributed computing system and methods consistent with the present invention. Initially, a skeleton on the server unmarshalls parameters and data from a task request and recreates the original task as transmitted (step 504). Unmarshalling these parameters may include downloading several additional types. The skeleton determines if the types related to the task request are available on the server (step 506). If the types associated with the task request are not available, the skeleton must download the tasks from one of the areas on the network (step 509). For example, if a "PI( )" class is not on the server, the skeleton server will down load this type from the client. The type or class is used by the skeleton to map data in the object and marshall parameters and data.

Typically, the client will indicate in the request package where the particular type is located. The skeleton can download the requested type from a object/method repository and can cache the type for future server requests. Also, the requested type could also be located on the client. For example, in Java and RMI the class containing the particular type is located in the given codebase URL (universal record locator) transmitted by the client. Dynamic class loading features in RMI facilitate the automatic downloading of the class using the codebase. These types enable the skeleton to parse the task request and extract the appropriate data and parameters. The steps outlined above make the parameters and data readily available for further processing.

Once the appropriate types are available, the skeleton invokes the generic compute method (step 508). The generic compute method on the server then executes the specific task requested by the client (step 510). For example, assume the client calls "ComputeServer.runTask(new PI(1000))". The skeleton will invoke the generic compute method "runTask" on the server. The "runTask" method calls the "run( )" method embedded in the task called by the client. Further, the "runTask" method implements the remote interface "Compute" which maintains the remote connection with the client. At the option of the client or a predetermined setting on the server, the skeleton stores results from the computed tasks in a cache if a subsequent task will use the results. As a final step on the server, the computed task or results are returned to the client by executing "return t.run( )" on the server (step 512).

EXEMPLARY IMPLEMENTATION

Consistent with the present invention, the following code sample is provided as one implementation. Although this example is provided in the object-oriented Java programming language other programming languages could also be used. For example, the server can include the following Java code:

```
THE TASK
public interface Task extends Serializable {
            //This interface allows a class (the "PI"
            // class ) to implement the abstract
            // run( ) class
    {
        Public Object run( );
    }
THE REMOTE INTERFACE:
import java.rmi.*;
public interface Compute extends Remote {
            // The RMI/RPC Interface
public Object runTask(Task t) throws RemoteException;
                        //The abstract runIt method
    }
THE COMPUTE SERVER IMPLEMENTATION
import java.rmi.*;
import java.rmi.server.*;
public class ComputeServer extends UnicastRemoteObject
implements Compute{
        public ComputeServer ( ) throws RemoteException{ }
                    //Implements the Compute interface
                    //abstract "runTask" method
    // ... Code in this area is used for initializing the routine with RPC
system
        public Object runTask (Task t) throws RemoteException
                    // runTask implements the abstract
method
                    // defined in ComputerServer interface
    return t.run( );   //
    }
    The following exemplary Java code can be used on a client
performing dynamic distributed computing consistent with the present
invention.
        class PI {
        private int precision;
        PI (int howManyPlaces) { // sets precision of PI value to be
calculated later
            precision = howManyPlaces;
        }
        public Object run( ) {   // implement the abstract run method in the
                            // compute interface
        double pi = computePIsomehow(precision); // calculate pi
        return new Double(pi);
        }
        public static void main (String[ ] args) {
        ComputerServer server = getAComputerServer( );  // Select a server
                                                        // from the
                                                        // network and
                                                        // store in remote
                                                        // compute call
                                                        // to RMI RPC
                                                        // abstract remote
                                                        // interface
        Double pi = server.runTask(new PI(1000));    // implement abstract
                                                      // remote to execute a
                                                      // "pi" computation
                                                      // defined in "PI"
                                                      // class.
```

-continued

```
System.out.println("PI seems to be "+pi);    // return results in "pi"
                                              // variable and print to
                                              // standard out
```

While specific embodiments have been described herein for purposes of illustration, various modifications may be made without departing from the spirit and scope of the invention. Those skilled in the art understand that the present invention can be implemented in a wide variety of hardware and software platforms and is not limited to the traditional routers, switches, and intelligent hub devices discussed above. Accordingly, the invention is not limited to the above described embodiments, but instead is defined by the appended claims in light of their full scope of equivalents.

What is claimed is:

1. A method performed on a processor operatively coupled to a collection of servers, which enables a client associated with the processor to dynamically distribute a task to a server, the method comprising:
    selecting a server to process the task;
    forming a task request from parameters and data;
    sending the task request to the selected server, wherein the selected server:
        downloads a class definition after receiving the task request, wherein the class definition maps locations of information in the task request and allows the selected server to process the task request;
        extracts parameters and data from the task request using the downloaded class definition; and
        invokes a generic compute technique capable of executing a plurality of types of tasks, wherein the generic compute technique executes the task request using the extracted parameters and data; and
    receiving results associated with the executed task request from the selected server.

2. The method of claim 1, wherein the processor is operatively coupled to a computer system having a primary storage device, a secondary storage device, a display device, and an input/output mechanism.

3. The method of claim 1, wherein the task is developed in a programming language and environment compatible with each of the server computers.

4. The method of claim 3, wherein the environment includes a remote procedure call subsystem.

5. The method of claim 4, wherein the remote procedure call subsystem is the Remote Method Invocation (RMI) system.

6. The method of claim 1, wherein the server is selected from a plurality of heterogeneous computer systems.

7. The method of claim 6, wherein the selected server has the lowest load characteristic compared with average load characteristic of the servers over a predetermined time period.

8. The method of claim 1, wherein selecting the server comprises selecting the server based on the overall processing load distribution among the collection of servers.

9. The method of claim 1, wherein selecting the server comprises selecting the server based on the specialized computing capabilities of each server.

10. The method of claim 9, wherein the specialized computing capabilities include a capability to render images.

11. The method of claim 1, wherein the sending step further comprises the substeps of:
    determining if code related to the requested task is present on the selected server; and
    downloading the code onto the selected server when the code is not present on the selected server.

12. The method of claim 1, wherein the sending step further comprises: providing the task as a parameter to the generic compute method.

13. The method of claim 3 further comprising the step of indicating to the server that results from a computed task should be stored in a result cache on the selected server for subsequent tasks to use.

14. The method of claim 1, wherein the results are used for further processing on the client.

15. The method of claim 1, wherein the results comprise an object.

16. The method of claim 1, wherein the server downloads the class definition from a location indicated by a URL parameter in the task request.

17. The method of claim 1, wherein the server provides the task request as a parameter to the generic compute technique.

18. A method performed on a processor operatively coupled to a collection of servers, which enables a server associated with the processor to dynamically receive and process a task from a client computer wherein the task is in an executable programming language compatible with each of the server computers, the method comprising:
    downloading a class definition after receiving a task request, wherein the class definition maps locations of information in the task request and allows the server to process the task request;
    assembling parameters and data from a the task request into a task, using the downloaded class definition;
    invoking a generic compute method, capable of processing a plurality of types of tasks, on the server, wherein the generic compute method executes the task and generates results; and
    returning results to the client.

19. The method of claim 18, wherein the processor is operatively coupled to a computer system having a primary storage device, a secondary storage device, a display device, and an input/output mechanism.

20. The method of claim 18, wherein the task is developed in a programming language and environment compatible with each of the server computers.

21. The method of claim 18, wherein the task is developed using the Java programming language and environment.

22. The method of claim 21, wherein the environment includes a remote procedure call subsystem.

23. The method of claim 22, wherein the remote procedure call subsystem is the Remote Method Invocation (RMI) system.

24. The method of claim 18, wherein the assembling step further comprises:
    determining if types related to the task are available on the server;
    when types are not available on the server, downloading the types onto the server from a location as indicated by the parameters provided by the client; and
    executing the task based upon the data and parameters provided by the client.

25. The method of claim 24, wherein the determining step and the downloading steps are performed by a remote procedure call (RPC) subsystem.

26. The method of claim 25, wherein the determining step is performed by a Remote Method Invocation (RMI) type of remote procedure call subsystem.

27. The method of claim 18, further comprising the substep of storing the results from the task in a cache if a subsequent task will use the results.

28. A computer readable medium containing instructions for controlling a computer system comprising a collection of servers to perform a method for enabling a client to dynamically distribute a task to a server, the method comprising the steps of:
    selecting a server to process the task;
    forming a task request from parameters and data;
    sending the task request to the selected server, wherein the selected server:
        downloads a class definition after receiving the task request, wherein the class definition maps locations of information in the task request and allows the selected server to process the task request:
        extracts parameters and data from the task request using the downloaded class definition; and
        invokes a generic compute method capable of executing a plurality of types of tasks, wherein the generic compute technique executes the task request on the selected server using the extracted parameters and data; and
    receiving results associated with the executed task request from the selected server.

29. The computer readable medium of claim 28, wherein the computer system is operatively coupled to a primary storage device, a secondary storage device, a display device, and an input/output mechanism.

30. The computer readable medium of claim 28, wherein the task is developed in a programming language and environment compatible with each of the servers.

31. The computer readable medium of claim 30, wherein the environment includes a remote procedure call subsystem.

32. The computer readable medium of claim 31, wherein the remote procedure call subsystem is the Remote Method Invocation (RMI) system.

33. The computer readable medium of claim 28, wherein the selected server is selected from a plurality of heterogeneous computer systems.

34. The computer readable medium of claim 28, wherein selecting the server comprises selecting the server based on the overall processing load distribution among the collection of servers.

35. The computer readable medium of claim 28, wherein selecting the server comprises selecting the server based on a lowest load characteristic compared to an average load characteristic of the servers over a predetermined period of time.

36. The computer readable medium of claim 28, wherein selecting the server comprises selecting the server based on the specialized computing capabilities of each server.

37. The computer readable medium of claim 16, wherein the specialized computing capabilities include a capability to render images.

38. The computer readable medium of claim 28, wherein the sending step further comprises:
    determining whether code related to the requested task is present on the selected server; and
    downloading the code onto the selected server if the code is not present on the selected server.

39. The computer readable medium of claim 28, wherein the sending step further comprises:
    providing the task as a parameter to the generic compute method.

40. The computer readable medium of claim 28 further comprising the step of indicating to the server that results from a computed task should be stored in a result cache on the selected server for subsequent tasks to use.

41. The computer readable medium of claim 28, wherein the results are used for further processing on the client.

42. The computer readable medium of claim 28, wherein the results comprise an object.

43. A computer readable medium containing instructions for controlling a computer system comprising a collection of servers to perform a method for enabling a server to dynamically receive and process a task from a client computer wherein the task is in an executable programming language compatible with each of the servers, the method comprising:
    downloading a class definition after receiving a task request, wherein the class definition maps locations of information in the task request and allows the server to process the task request;
    assembling parameters and data from the task request into a task, using the downloaded class definition;
    invoking a generic compute method, capable of processing a plurality of types of tasks, on the server, wherein the generic compute method executes the task and generates results; and
    returning results to the client.

44. The computer readable medium of claim 43, wherein the computer system is operatively coupled to a primary storage device, a secondary storage device, a display device, and an input/output mechanism.

45. The computer readable medium of claim 43, wherein the task is developed in a programming language compatible with each of the servers.

46. The computer readable medium of claim 43, wherein the task is developed using a Java programming language and environment.

47. The computer readable medium of claim 43, wherein the environment includes a remote procedure call subsystem.

48. The computer readable medium of claim 47, wherein the remote procedure call subsystem is the Remote Method Invocation (RMI) system.

49. The computer readable medium of claim 43, wherein the assembling step further comprises:
    determining if types related to the task are available on the server;
    when the types are not available on the server, downloading the types onto the server from a location as indicated by the parameters provided by the client; and
    executing the task based upon the data and parameters provided by the client.

50. The computer readable medium of claim 49, wherein the determining step and the downloading steps are performed by a remote procedure call (RPC) subsystem.

51. The computer readable medium of claim 50, wherein the determining step is performed by a Remote Method Invocation (RMI) type of remote procedure call subsystem.

52. The computer readable medium of claim 43, further comprising:
    storing the results from the task in a cache if a subsequent task will use the results.

* * * * *